Dec. 8, 1936.    B. C. MALICK    2,063,391
ELECTRODE MOUNTING
Filed Dec. 29, 1934
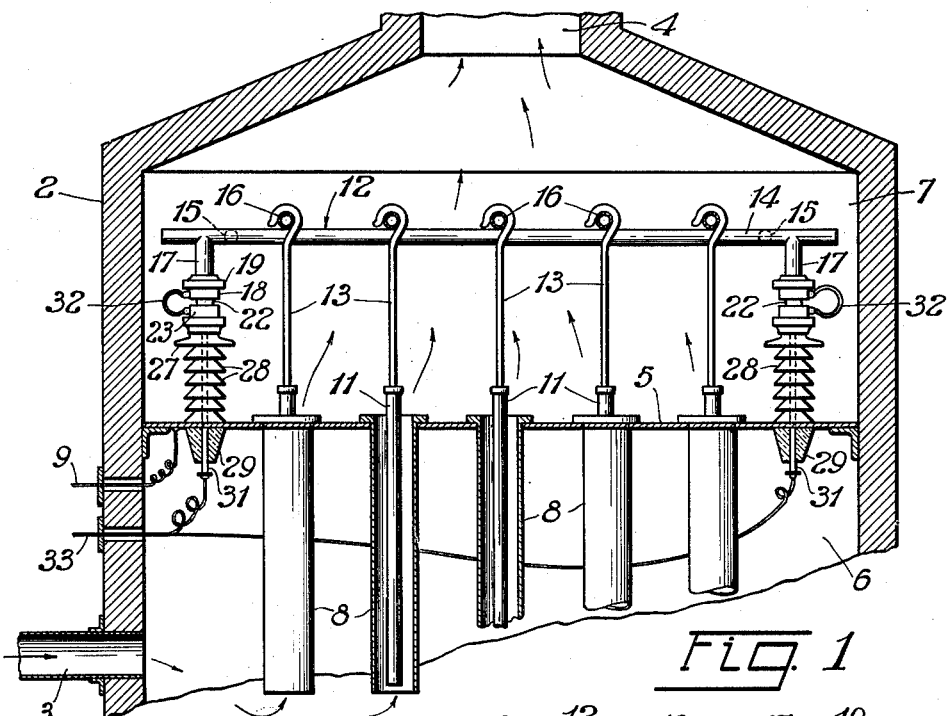
Fig. 1
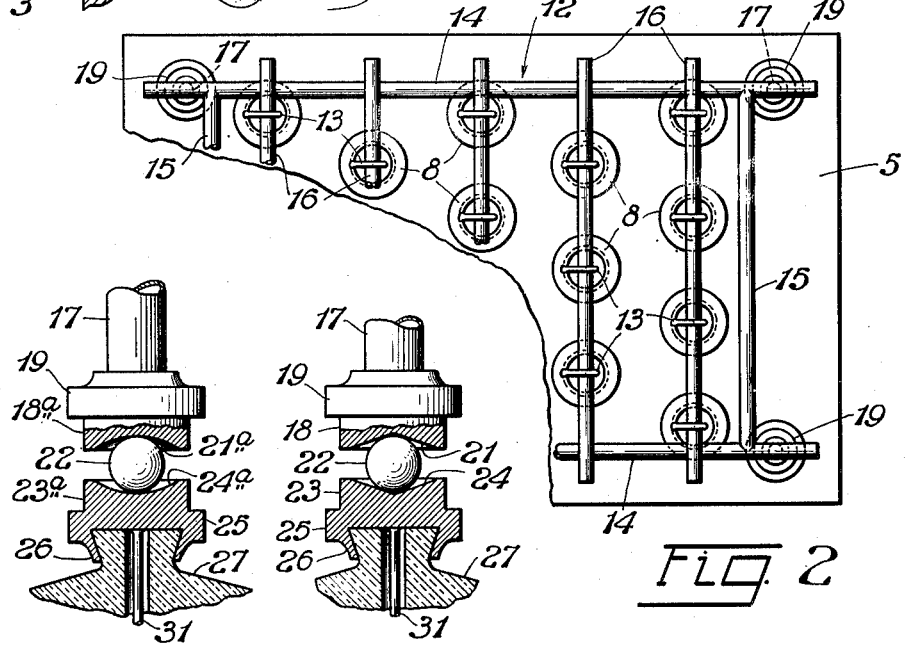
Fig. 2
Fig. 4
Fig. 3
INVENTOR
*Boyd C. Malick*
BY
*Bruce K. Brown*
ATTORNEY Patented Dec. 8, 1936

2,063,391

UNITED STATES PATENT OFFICE 2,063,391

ELECTRODE MOUNTING

Boyd C. Malick, Whiting, Ind., assignor to Standard Oil Company, Chicago, Ill., a corporation of Indiana Application December 29, 1934, Serial No. 759,735

11 Claims. (Cl. 183—7)

This invention relates to improvements in electrode mounting and more particularly to mountings for the electrode assemblies of an electrical precipitator or similar apparatus wherein the assemblies are subjected to relatively high temperatures.

In electrical precipitators intended for use in sulfuric acid plants, or for the precipitation of solid particles from furnace or oven flue gases the electrodes together with the electrode supporting structure and insulated mountings therefor are subjected to high temperatures during the operation of the precipitator, which in many cases results in the distortion of the electrode supports and mounting through thermal expansion in an amount sufficient to fracture the joints and bonds between the various metal members comprising the supporting structure. Furthermore, such distortion of the supporting structure may result in dislocation of the suspended electrodes with respect to the axis of the surrounding stationary cylindrical electrodes in the case of a conventional precipitator constructed as disclosed in detail herein.

It is therefore an object of my invention to provide an electrode mounting upon which the electrode supporting structure is carried that will preclude rupture of the joints and bonds thereof which might otherwise occur through thermal expansion of the metallic parts of the supporting structure during the course of operation of the precipitator.

Another object is to provide an electrode mounting, as described, which tends constantly to maintain the electrode supporting structure in proper relationship to the stationary electrodes, thereby to encourage the maintenance of proper relative positions between the suspended electrodes and the stationary electrodes.

Other objects, the advantages, and uses of the invention will be apparent upon reading the following specification and claims, and after consideration of the drawing forming a part of the specification wherein:

Fig. 1 is a fragmentary sectional view through an electrical precipitator of the type employed in sulfuric acid plants incorporating the features of my invention;

Fig. 2 is a top plan view of the electrode supporting structure and mounting therefor;

Fig. 3 is a fragmentary view, partially in section, of my improved electrode mounting; and Fig. 4 is a view similar to Fig. 3 of another form of the mounting.

With reference to Fig. 1, the electrical precipitator illustrated comprises a brick housing 2 having an inlet 3 through which sulfuric acid vapors are admitted to the housing and a flue 4 at the top of the housing which may be connected to a stack or other suitable gas disposal means. A horizontal metal partition wall 5 separates the housing 2 into upper and lower sections 6 and 7 respectively. A plurality of tubular electrodes 8 extend through the partition wall 5 and downwardly into the lower section 6 and are so arranged that the sulfuric acid gases and vapors admitted through the flue 3 must pass upwardly through the electrodes 8 on their way to the upper section 7 and to the flue 4. The electrodes 8, by contact with the metal partition 5, are connected in multiple and the partition wall is connected through a bus 9 with the positive terminal of a uni-directional high tension current source, of conventional construction, not shown.

Discharge electrodes 11, preferably comprising carbon rods, are provided one for each of the tubular electrodes 8 and are suspended within the tubular electrodes along the axis thereof upon a supporting structure generally indicated 12 through the medium of metal hook members 13.

In Fig. 2 I have illustrated the supporting structure 12, in plan view, which may comprise a pair of six inch iron pipes 14 spaced apart from one another and joined by cross members 15 also formed of iron pipe, and a plurality of two inch pipes 16 in parallel relationship supported at opposite ends upon the pipes 14. All of the pipe elements of the supporting structure may be welded to one another to provide rigidity as well as adequate bonding for the purpose of conducting the high tension current to the electrodes. The electrodes 11 are suspended directly from the pipes 16 by engagement of the hook members 13 therewith.

Short six inch pipe sections 17 may be welded to the opposite end portions of the parallel pipes 14 and each has, at its lower end a hardened steel bearing plate 18 joined to the pipe 17 through the medium of a flange member 19. Welding bonds between the plate 18, flange member 19 and pipe 17 may be employed to provide rigidity of structure as well as to reduce the resistance of the electrical connection therebetween. The plates 18 are each provided with a shallow conical recess 21 in their lower surface adapted to partially receive a hardened steel ball 22, which ball may rest upon a bearing plate 23 identical in structure to the plate 18 but inverted, the ball 22 resting in a shallow conical recess 24. The plate 23 may be secured, as by welding, to a pintle 25 secured, as shown at 26, to the upper end of an upright porcelain insulator 27 of the type having petticoat side walls, as indicated at 28 and commonly employed for high tension electrodes. The insulators 27 are mounted upon the metal partition wall 5, a portion 29 thereof extending through the partition wall, and each may be provided with a central electrode 31 extending therethrough and connected at its upper end with the pintle 25. Jumpers 32 may be connected between the flange members 19 and the pintles 25 in order to conduct the high tension current about the ball joint support of the mounting. The electrodes 31 may be connected in multiple and to a bus 33 for connection with the negative terminal of the high tension current supply.

In operation hot sulfuric acid gases and vapors admitted to the chamber 6 through the inlet 3 are caused to pass through the tubular electrodes 8 and therefore through the high tension electrical field between the carbon discharge electrodes 11 and the inner walls of the tubular collecting electrodes 8 thus, through ionization of the gases, to cause the liquid droplets of sulfuric acid to coalesce and to fall downwardly through the tubular electrodes upon the floor of the chamber 6, or into suitable pans provided therefor.

Inasmuch as the gases admitted to the chamber 6 are at a relatively high temperature contact between the gases and the electrode supporting structure 12, will cause thermal expansion of the pipe elements comprising the supporting structure. Such expansion may be particularly evident in the linear expansion of the relatively long and parallel pipes 14. With the structure mounted upon my improved electrode mountings, such elongation of the pipes 14 will result in the movement of the bearing plates 18 relative to the stationary bearing plates 23. This movement may take place without establishing any harmful strains whatsoever since the steel balls 22 in combination with the opposed bearing plates provide a virtually frictionless mounting.

During expansion, or contraction, of the electrode supporting structure 12, as described, the inclined walls of the conical recesses 21 and 24 of the bearing plates 18 and 23 respectively tend to maintain the carbon electrodes 11 in proper central alignment with the cylindrical or tubular electrodes 8. In other words, linear expansion of the members 14, for example, will cause the bearing plates 18 at opposite ends of the pipes 14 to move equal distances from the center of the complementary bearing plates 23 with the result that the mid-portions of the pipes 14 will not change their positions relative to the stationary tubular electrodes 8. The same may be said as to the result of linear expansion of the cross-pipes 15 comprising a part of the electrode supporting structure, which, together with the hangar pipes 16 are also subject to equal linear expansion and contraction under the influence of temperature fluctuations.

In Fig. 4 I have illustrated another form of the electrode mounting which differs from that illustrated in detail in Fig. 3 only in the contour of the pockets 21a and 24a in the bearing plates 18a and 23a respectively. In this form of the mounting the pockets have spherical walls as distinguished from the conical walls of the pockets 21 and 24, the radius upon which the curvature of the walls is developed being approximately four times that of the radius of the balls 22.

While I have presented herein certain embodiments of my invention by description and illustration of the detailed structure thereof it is to be understood that such disclosure is for the purpose of illustration only and that the scope of my invention is to be limited only by the appended claims.

I claim:

1. An electrode mounting comprising, a substantially rigid metal electrode supporting frame including a plurality of depending vertical members, insulators fixed beneath and in substantial axial alignment with said members, and substantially frictionless thrust bearings interposed between said members and said insulators.

2. An electrode mounting comprising, a substantially rigid metal electrode supporting frame including a plurality of depending vertical members, insulators fixed beneath and in substantial axial alignment with said members, metal bearing plates fixed upon the adjacent ends of said depending members and said insulators, said plates having relatively shallow concave recesses in their opposed faces, and steel balls interposed between said plates and engageable with the walls of said recess to provide substantially frictionless thrust bearings between said members and said insulators.

3. An electrode mounting comprising, a substantially rigid metal electrode supporting frame including a plurality of depending vertical members, insulators fixed beneath and in substantial axial alignment with said members, metal bearing plates fixed upon the adjacent ends of said depending members and said insulators, said plates having relatively shallow concave recesses in their opposed faces, and steel balls interposed between said plates and engageable with the walls of said recess to provide substantial frictionless thrust bearings between said members and said insulators, said recess in said bearing plates having conical side walls thereby tending to locate said steel balls centrally of the recess.

4. An electrode mounting comprising, a substantially rigid metal electrode supporting frame including a plurality of depending vertical members, insulators fixed beneath and in substantial axial alignment with said members, metal bearing plates fixed upon the adjacent ends of said depending members and said insulators, said plates having relatively shallow concave recesses in their opposed faces, steel balls interposed between said plates and engageable with the walls of said recess to provide substantially frictionless thrust bearings between said members and said insulators, and jumpers between said adjacent bearing plates to provide an electrical shunt about said bearings.

5. An electrode mounting comprising, an electrode supporting frame including a depending rigid member, an insulator fixed beneath and in substantial axial alignment with said depending member and an electrode extending axially through said insulator, metal bearing plates fixed upon the adjacent ends of said insulator and said depending member, said plates having relatively shallow concave recesses in their opposed faces, steel balls interposed between said plates and engageable with the walls of said recess to provide a substantially frictionless thrust bearing and a jumper between said adjacent bearing plates to provide an electrical shunt about said bearing.

6. An electrode mounting comprising, an upright insulator, a metal bearing plate mounted upon said insulator and having a shallow recess formed in the upper face thereof, a steel ball resting in said recess and free to roll upon the wall of the recess, and the metal bearing plate in axial alignment with said first bearing plate adapted to be fixed to an electrode support, said second named bearing plate having a shallow recess in the lower face thereof, within which said ball is partially received.

7. An electrode mounting comprising, an upright insulator, a metal bearing plate mounted upon said insulator and having a shallow spherical walled recess formed in the upper face thereof, a steel ball resting in said recess and free to roll upon the wall of the recess, and the metal bearing plate in axial alignment with said first bearing plate adapted to be fixed to an electrode support, said second named bearing plate having a shallow spherical walled recess in the lower face thereof, within which said ball is partially received.

8. In an electrical precipitator, a plurality of stationary electrodes, a rigid metallic electrode supporting frame, a plurality of electrodes suspended from said supporting frame and arranged in operative registration with said stationary electrodes, stationary insulators mounted beneath portions of said supporting frame, members rigidly fixed to said supporting frame and extending downwardly therefrom in substantial axial alignment with said insulators and means providing frictionless supporting contact thrust bearings between said insulators and said last named members whereby the members may move laterally upon substantial contraction of said supporting frame toward or away from the axis of said insulators.

9. In an electrical precipitator, a plurality of stationary electrodes, a rigid metallic electrode supporting frame, a plurality of electrodes suspended from said supporting frame and arranged in operative registration with said stationary electrodes, stationary insulators mounted beneath portions of said supporting frame, members rigidly fixed to said supporting frame and extending downwardly therefrom in substantial axial alignment with said insulators and means providing frictionless supporting contact thrust bearings between said insulators and said last named members whereby the members may move laterally upon substantial contraction of said supporting frame toward or away from the axis of said insulators, said bearings, including bearing plates fixed to said members and said insulators respectively, having shallow concave recesses formed in their opposed faces and steel balls between the bearing plates and partially received within said recess.

10. An electrode mounting comprising, an electrode supporting frame, a member depending from said frame, an insulator fixed below and in substantial axial alignment with said member, and substantially frictionless bearing means interposed between said member and said insulator to provide a substantially frictionless thrust bearing between said member and said insulator.

11. An electrode mounting comprising, a substantially rigid metal electrode supporting frame including a plurality of depending vertical members, insulators fixed beneath and in substantial axial alignment with said members, metal bearing plates fixed upon the adjacent ends of said depending members and said insulators, said plates having recesses in their opposed faces, and means interposed between said plates and engageable with the walls of said recess to provide substantially frictionless thrust bearings between said members and said insulators.

BOYD C. MALICK.